(12) United States Patent
Zwicker

(10) Patent No.: US 7,729,793 B2
(45) Date of Patent: Jun. 1, 2010

(54) SYSTEM AND METHOD FOR ORGANIZING WORK PIECES

(76) Inventor: Hans-Georg Zwicker, Nordring 98 A/III, Nürnberg (DE) 90409

( * ) Notice: Subject to any disclaimer, the term of this patent is extended or adjusted under 35 U.S.C. 154(b) by 134 days.

(21) Appl. No.: 11/894,796

(22) Filed: Aug. 21, 2007

(65) Prior Publication Data

US 2008/0097642 A1    Apr. 24, 2008

(30) Foreign Application Priority Data

Aug. 22, 2006   (DE)   ........................ 10 2006 039 207

(51) Int. Cl.
  *G06F 19/00*   (2006.01)
  *G06F 7/00*    (2006.01)
(52) U.S. Cl. ........................ 700/114; 700/112; 700/115; 700/116; 700/228; 700/229
(58) Field of Classification Search .......... 700/108–110, 700/112, 114–116, 224–229
See application file for complete search history.

(56) References Cited

U.S. PATENT DOCUMENTS

| | | | | |
|---|---|---|---|---|
| 4,473,883 A | * | 9/1984 | Yoshida et al. | ............... 700/179 |
| 4,484,289 A | * | 11/1984 | Hemond | ....................... 700/113 |
| 4,588,880 A | * | 5/1986 | Hesser | ......................... 235/376 |
| 4,821,198 A | * | 4/1989 | Takeuchi et al. | ............ 700/116 |
| 4,870,590 A | * | 9/1989 | Kawata et al. | ............... 700/115 |
| 5,373,451 A | * | 12/1994 | Furukawa | .................... 700/228 |
| 5,399,531 A | * | 3/1995 | Wu | ............................. 700/112 |
| 5,798,693 A | | 8/1998 | Engellenner | |
| 5,856,923 A | * | 1/1999 | Jones et al. | .................. 700/121 |
| 5,920,287 A | | 7/1999 | Belcher et al. | |
| 5,984,498 A | * | 11/1999 | Lem et al. | ....................... 700/2 |
| 6,067,507 A | * | 5/2000 | Beffa | ......................... 702/118 |
| 6,308,107 B1 | * | 10/2001 | Conboy et al. | .............. 700/121 |
| 6,889,109 B1 | | 5/2005 | Solan et al. | |
| 2003/0055525 A1 | | 3/2003 | Graham | |
| 2003/0083776 A1 | * | 5/2003 | Schauer et al. | .............. 700/218 |

FOREIGN PATENT DOCUMENTS

DE    101 53 507    7/2002
GB    2 373 357 A    9/2002

* cited by examiner

*Primary Examiner*—Ramesh B Patel
(74) *Attorney, Agent, or Firm*—Merchant & Gould P.C.

(57) ABSTRACT

A system and method provides computer-assisted organization of workpieces to be processed in a production process, wherein the workpiece in question is subjected to at least one processing, preferably to a plurality of different processings. A workpiece position is assigned to each workpiece, and at least one, preferably several, workpiece positions are combined in a magazine. Each workpiece position includes a device for status determination of the respective workpiece position. A control unit is provided for controlling the individual workpiece positions, and a data-processing unit is provided, which communicates with the control unit and in which the information queried from the individual workpiece positions is processed and status data is generated.

25 Claims, 5 Drawing Sheets

SYSTEM AND METHOD FOR ORGANIZING WORK PIECES

BACKGROUND OF THE INVENTION

The present invention relates to a system for computer-assisted organization of workpieces to be processed, as well as to a corresponding method of organization.

In a production process, workpieces are subjected to different processings, which are carried out by a plurality of different tools. For example, in the production of an injection mold in the tool room, starting from a blank the workpiece in question is bored, milled, wire-cut and ground, polished, and the like. In this, the workpiece in question is usually situated on a workpiece carrier, especially on a so-called "pallet", that serves as a base for the clamping of the workpiece into the processing devices. The pressure of productivity leads to the fact that the cycle times of workpieces must be ever shorter and the utilization of the machines improved. In addition, errors in the production process, for example due to an incorrect occupying of a magazine position by the operator, a necessary reworking of the workpiece, or through false information of the controls, should be avoided. All of this causes considerable delays in the production process. If organizational changes in the production process become necessary, it must be possible to react to such changes quickly.

Known from US 2003/0055525 A1 is a system as well as a method for production of plastic injection-mold components. This known system comprises a number of so-called subcells, in each of which a number of workpieces are held ready and are processed, as well as a superordinated master cell with a central control unit as well as a central robot for feeding the workpieces stored in the master cell to the individual subcells. Each individual pallet is provided with an ID, for example in the form of a computer chip, a barcode, or an optical code. The IDs ensure that the master robot can identify the workpieces in question with the aid of the ID of the pallet and thereby join the correct workpiece, for example an injection mold or an electrode, with the correct carrier intended for it. Typically, extraction robots have a reader on their grasping arms. However, this is associated with very long identification times. During this time, the robot cannot load or unload any machine. If an operator looks at the magazine, he perceives only free as well as occupied workpiece positions. However, the operator cannot perceive which workpiece position is actually free (as opposed to a workpiece position that is only temporarily occupied, since the workpiece is being processed in the machine just then). This represents a source of uncertainty that negatively affects the process.

Described in the offprint from *Werkzeug und Formenbau* 5, 05, published by MI Verlag moderne Industrie, is the Winstat MES system, in which each pallet, i.e. each electrode holder, possesses a contact-free identification system in the forms of a transponder. At the start of the processing, the workpiece is mounted in the pallet as a blank and the ID of the pallet is registered in the system via a portable PC. Then, depending on the imported ID, the processing programs needed for the planned processing can be called up by the system. Common to the aforementioned prior art is the fact that although pallets are already identified by the system, nevertheless the selection or assignment of pallets to workpiece positions still takes place in operation by the operator, so to speak by hand, or, based on the central data-processing unit, a selection of the relevant workpiece type as such takes place.

SUMMARY OF THE INVENTION

The task of the present invention consists in making available a generic system as well as method for computer-assisted organization of workpieces to be processed in a processing process, in which an automated handling of workpieces can be carried out with increased process reliability and, at the same time, the cycle times of workpieces in complex processing processes can be considerably shortened.

The above-stated task is accomplished in the generic system through the facts that each workpiece position displays means for status determination of the workpiece in question, a control unit for controlling the individual workpiece positions is provided, and a data-processing unit, preferably a central data-processing unit, is provided, which data-processing unit communicates with the control unit, processes the information read from the individual workpiece positions, and generates status data. Through these means, it is ensured that not merely an identification of the workpiece, e.g. a mold or electrode to be processed, takes place via the associated pallet, but also, in the overall system, a determination is simultaneously made as to the status of each individual workpiece position in the magazine. This information is managed in the course of the overall process management and is incorporated into the control of the process course. Through this results a distinct degree of optimization with respect to speed as well as reliability, in comparison with the system and method known until now.

The status determination of the workpiece position appropriately concerns the determination of whether or not a workpiece is located at a workpiece position. Thus, it is not necessary for an extraction robot to carry out each time an identification for this purpose. Through this means, a substantially quicker production course is ensured.

In addition or alternatively, the status determination of the workpiece position concerns the determination of whether or not a workpiece may be extracted from a workpiece position and/or whether or not a workpiece can be inserted. The aforementioned status determination results in the fact that time-consuming erroneous extractions or erroneous occupying of workpiece positions are eliminated.

In addition to this, each workpiece position can display a locking mechanism that, depending on the determined status of the workpiece position in question, locks the workpiece at the workpiece position, so that it cannot be inadvertently removed.

In addition or alternatively, the status determination of the workpiece position concerns information concerning the characteristics of the workpiece, in particular dimensions of the workpiece and/or alignment data of the workpiece in relation to the pallet. This information is appropriately obtained via an optical measuring apparatus. From this results, in turn, the advantage that from this information the data-processing unit knows that, for example, due to an oversize of the workpiece to be processed no workpiece can be placed into the neighboring workpiece position of the magazine. The device for determining this additional information can be located on the magazine, so that each individual magazine position or the workpiece situated therein can be optically read. However, it is theoretically also possible to read a readout, for example of the dimensions of the workpiece or its positioning on the pallet, at another location and to feed the associated data to the data-processing unit.

In addition, it is advantageous when an object reference is assigned to each workpiece position, so that the workpieces can be managed in the central data-processing unit in an object-referenced manner.

Appropriately, provided as means for the status determination is a receiving component, preferably at the respective workpiece position, by means of which component the status data can be generated or which component serves as a basis for the generation of the status data.

Preferably, with the receiver component it is a matter of a receiving antenna for the identification of a transponder, e.g. of an RFID transponder chip using 125 kHz technology, which transponder is located on the pallet or on the workpiece. The receiving antenna makes possible the reading in of the ID of the workpiece located at the workpiece position, including additional data relevant to the production process, as for example an object reference or the like, and the feeding of this to the data-processing unit via the control unit. By virtue of the use of a receiving antenna for the identifying of a transponder, it is possible to retrofit already-existing production systems in a technically simple manner.

Preferably, the transponder is attached to a workpiece carrier, in particular to the so-called pallet of the workpiece, or, if the workpiece is to be directly placed into the workpiece position, to the workpiece itself.

Each workpiece position is appropriately equipped with a receiving component belonging to it. The system thus possesses "intelligent" workpiece positions that are capable of making available to the production process the status data of all of the workpiece positions.

According to the system according to the invention, in advantageous manner, for a plurality of workpiece positions there is a plurality of means for status determination, preferably in the form of a series connection, i.e. a stub line, wherein the individual means for status determination of each workpiece position are read by the control unit, preferably cyclically, via a single interface. Through this means, in a technically simple manner a plurality of workpiece positions can be read by the control unit. The invention makes possible the reading of up to 280 workpiece positions within seconds via such a "chain".

According to a further embodiment of the system according to the invention, different magazines, which in each case display a plurality of correspondingly equipped workpiece positions, are queried by a control unit via magazine-associated interfaces. The control unit is thus capable of controlling a plurality of magazines that, for example, are positioned at different locations at a production site.

The supplying of energy to the individual means for status determination of the respective workpiece position takes place via the control unit.

According to an advantageous embodiment, for each workpiece position a single optical status display is additionally provided. This enables the operator, in a simple manner, to determine the current status of the workpiece position in question. In particular, this includes also the determination of whether a workpiece position is burdened with an error, for example through incorrect manual placement, or the workpiece is not to be removed due to organizational measures. Errors within the scope of the production process can thus be quickly discovered and, due to this, safely avoided.

The respective characteristics of the status display, i.e. the type of status data and/or the type of the display can be uniformly determined in the data-processing unit. The management of the status displays takes place centrally. The status display cannot be influenced from the respective workpiece position.

The status display appropriately takes place by means of different light devices, e.g. LEDs of different colors, wherein the particular combination at the time (e.g. red as well as green and/or switch-on combinations (on or off)) communicates to the operator the prevailing status.

The system further includes a number of individual functional units composed of at least one or several magazines and, in each case, an associated control unit, which functional units communicate with a central data-processing unit. Such functional units can, for example, be provided at different locations. Thus, through this means a location-overlapping optimization of the functional process is achieved.

The communication of a particular functional unit with the central data-processing unit can take place in various ways. Especially appropriate is a network connection, preferably a so-called wireless LAN (WLAN) connection. A connection via public networks (e.g. Internet) or private networks (e.g. intranet or the like) is also possible.

In each case, one workpiece can be fastened to a pallet. Alternatively, several workpieces can also be fastened to a pallet.

In addition, the control unit of each functional unit can include a special interface that is provided for diagnostic purposes, e.g. for connection to a diagnostic unit and/or for the carrying out of a base configuration.

Appropriately, several workpiece positions that are combined into a group are designed so as to be locationally-mobile in relation to the magazine. For example, for this purpose the workpiece position or the group of several workpiece positions are designed in the form of a carriage or a slide so as to be locationally-mobile. By means of the carriage or slide, the workpiece position or positions can be conveyed from other locations in the plant to the magazine in question in a simple manner. Likewise, the workpiece position or the group of several workpiece positions can also be designed as a portable unit.

For accomplishing the above-stated task, it is planned in the generic process that the particular workpiece position is controlled by a control unit, the particular workpiece position, having been queried, is read out in the form of status data, the queried data are transmitted to the data-processing unit, and generated from these data are status data for the particular workpiece position.

In the following, an appropriate embodiment of the system as well as method according to the invention is described in detail with the aid of drawn figures. For the sake of clarity, recurrent features are only provided once with a reference numeral.

DETAILED DESCRIPTION OF THE PREFERRED EMBODIMENTS

Figure 1A:
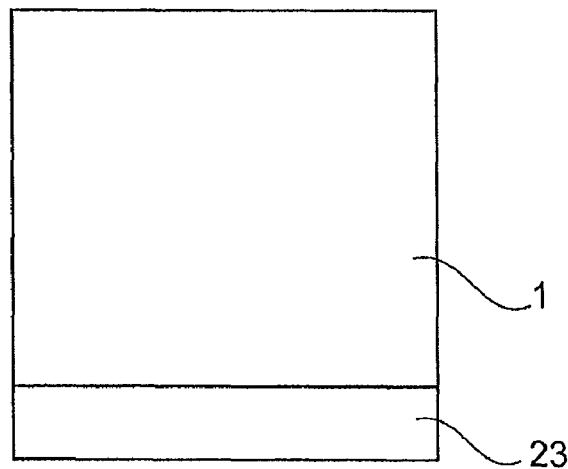
FIG. 1: shows a workpiece, positioned on a pallet, in the form of an injection mold produced in a production process, which mold, starting from a blank, has been processed in different processing steps (FIGS. 1A-1C), in a greatly simplified manner of representation.
Figure 1B:
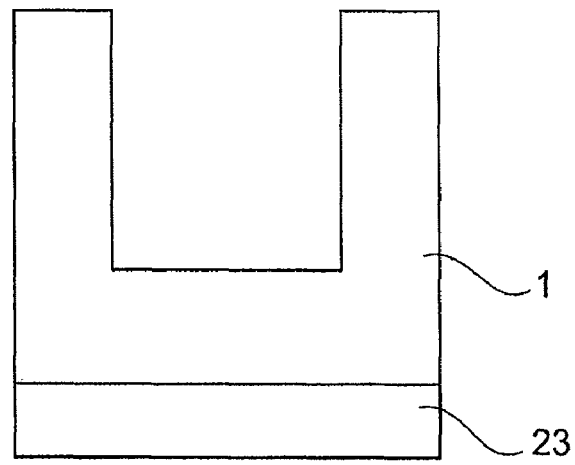
Figure 1C:
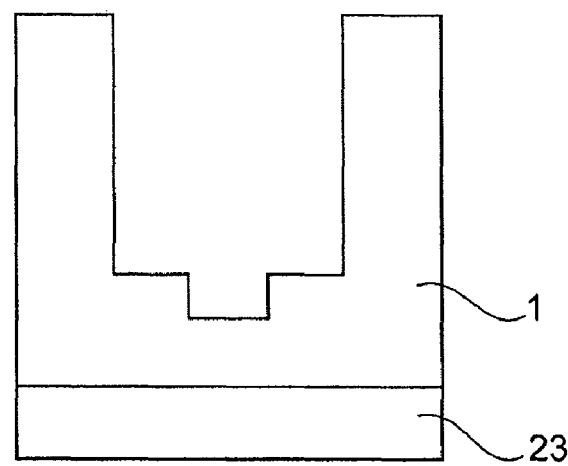

FIG. 1 shows, in a greatly simplified, schematic manner of representation, the different processing steps of a workpiece in the form of an injection mold for an injection-molding machine. Reference numeral 1 indicates the workpiece, which first forms the starting point for the production process as a blank according to FIG. 1 (A).

Reference numeral 23 identifies a pallet that serves as the carrying or fastening base for the workpiece 1 in the different processing devices. After the final processing of the workpiece 1, the workpiece 1 is separated from the pallet 23.

Starting from the blank shown in FIG. 1A, this blank is subjected to different processing steps. Thus, according to FIG. 1 (B), e.g. by means of a milling tool a large-volume recess is first produced in the top side of the blank. This processing takes place in a milling machine expressly intended for this purpose. Next, the workpiece 1 is fed to a further processing, in which an additional recess is produced at the base of the first recess, for example via a boring process according to FIG. 1 (C). Through sequentially-occurring processing measures of different types, the workpiece 1 is gradually brought into its final form and thus passes through a number of individual processing steps. The processing steps in FIGS. 1 (A)-1 (C) show greatly simplified schematic representations. In practice, such workpieces 1 are conveyed to a large number of different processing stations (boring stations, milling stations, wire-cutting stations, grinding stations, polishing stations, etc.) In addition, a large number of identical or even dissimilar workpieces are processed within the scope of a production process.

During these different processings, the workpiece 1 and the pallet 23 normally remain connected to each other.

Figure 2:
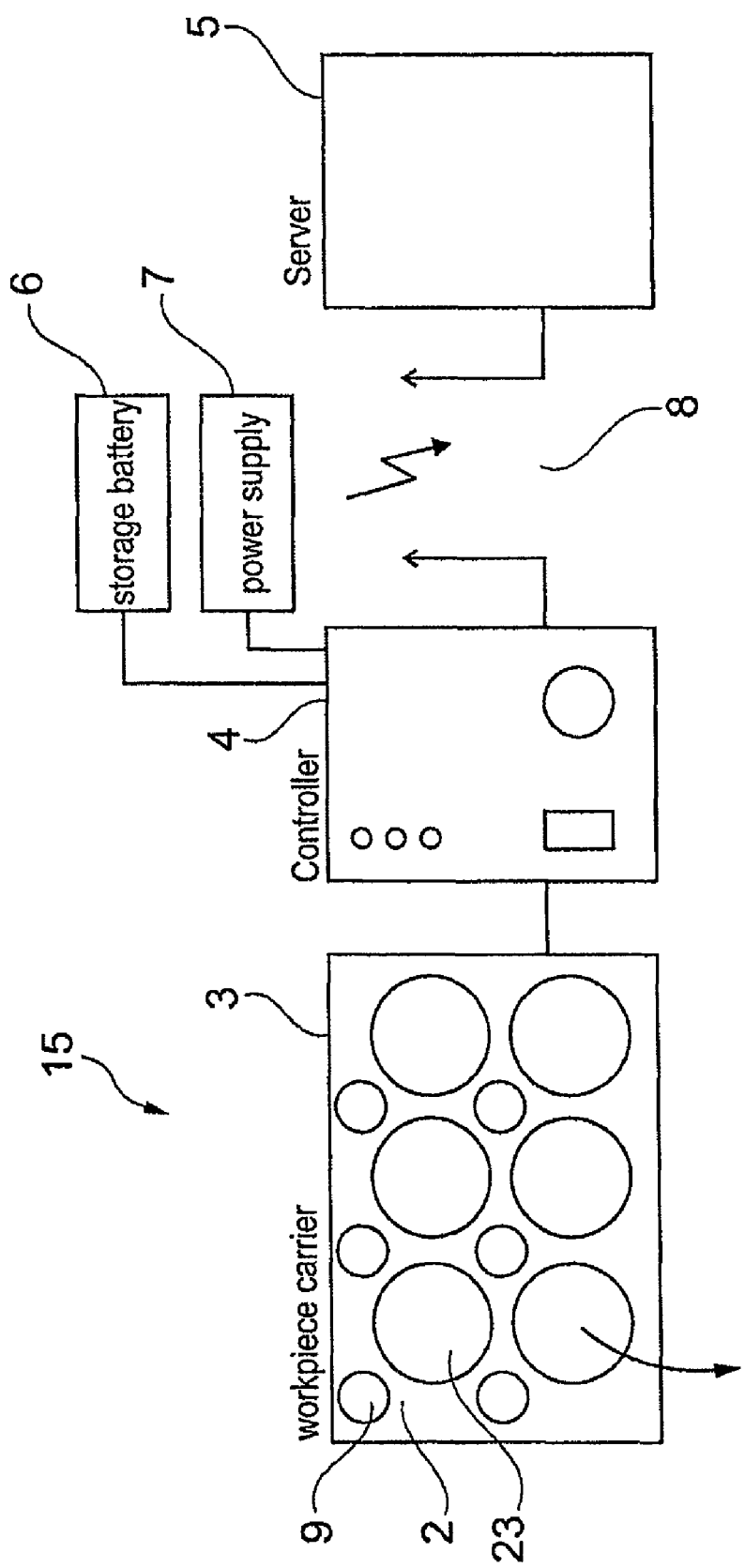
FIG. 2: shows an overall representation of the individual components of the system according to the invention, in a greatly simplified manner of representation.

FIG. 2 shows an overall view of the system according to the invention for computer-assisted organization of workpieces to be processed in a production process.

Reference numeral 3 identifies a magazine, which, for example, contains a total of six workpiece positions 2. Each workpiece position 2 is designed to accept a pallet 23 with one or several workpiece(s) that is/are to be processed in the production process. The arrow in FIG. 2 indicates that the pallets 23 are removable from the magazine 3.

Assigned to each workpiece position 2 is a means for status determination of the respective workpiece, preferably, according to FIG. 2, in the form of a so-called receiving antenna 9. Assigned to the magazine 3 is a control unit 4, which is supplied with electric current via a power supply 7. In addition to the power supply 7, a storage battery 6 is provided, which ensures the energy supply or, more precisely, guarantees the power supply in the event of a power outage.

Further included in the system is a data-processing unit 5, e.g. a server, which communicates with the control unit 4 via a suitable data connection. This data connection is appropriately a network connection, especially a wireless LAN (WLAN) connection. The magazine 3 and the control unit 4 together form a functional unit 15.

In the data-processing unit 5 the production data is centrally managed and, from there, is transmitted to the relevant process units, in particular the processing units.

Figure 3:
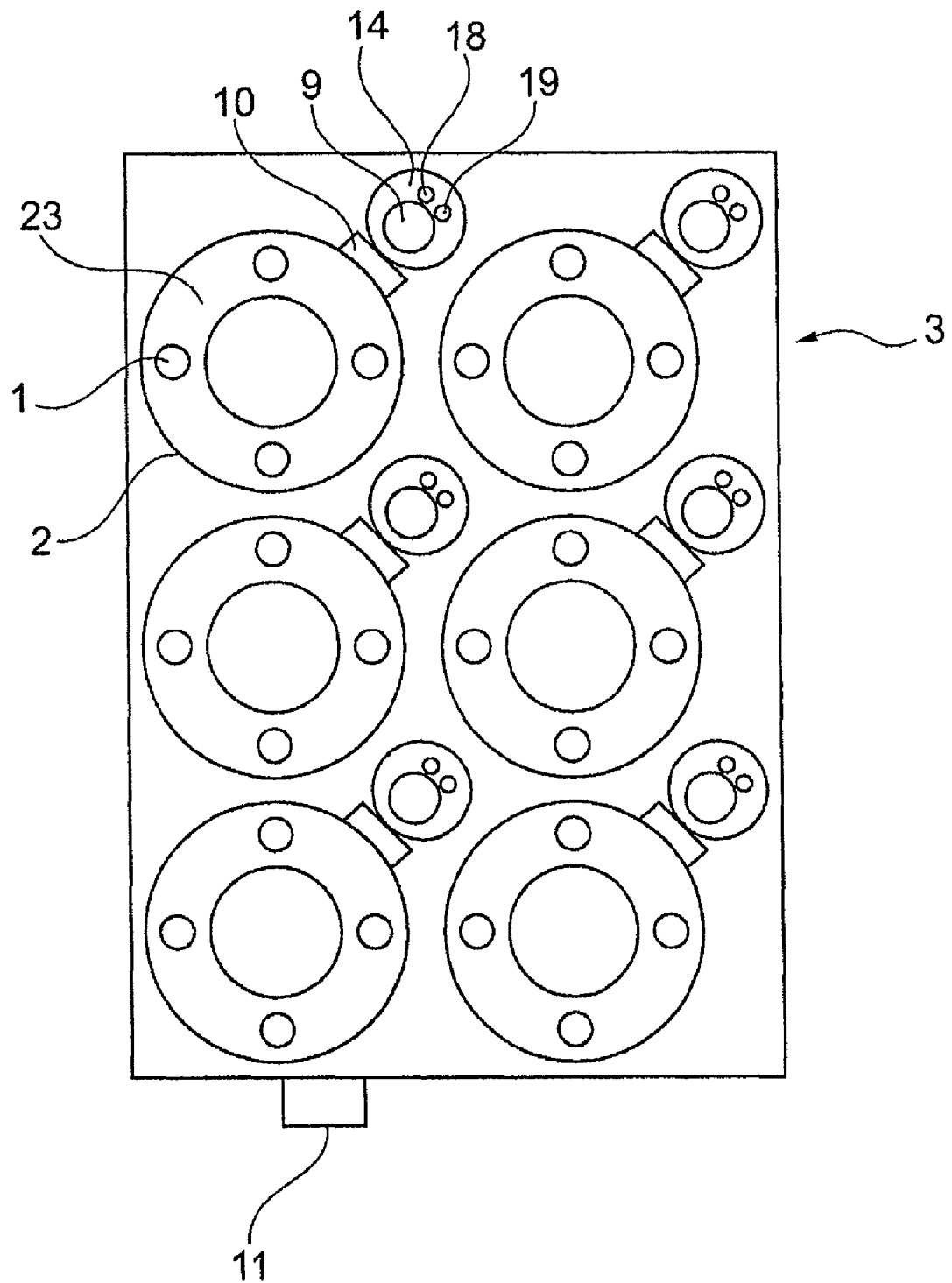
FIG. 3: shows a representation of a magazine comprising individual workpiece positions occupied by pallets.

According to FIG. 3, the magazine includes at each workpiece position 2 a receiving antenna 9 assigned to the respective workpiece position 2, which antenna is capable of identifying a workpiece placed in the respective workpiece position 2 via the transponder 10 of the workpiece, which transponder, in the embodiment according to FIG. 3, is permanently attached to the pallet 23 holding a total of four workpieces 1. The receiving antenna 9 is appropriately an antenna that is capable of reading transponder chips (RFID chips) using 125 kHz technology.

The receiving antenna 9 can be attached in a simple manner at an appropriate distance from the workpiece position 2 or from the workpiece 1 on the magazine 3. Each workpiece position 2 is equipped with a corresponding receiving antenna 9. All of the receiving antennas 9 of the magazine 3 are preferably connected to the control unit 4 (FIG. 2) in a series connection or stub line, via an interface 11. The respective receiving antenna 9 makes contact with the transponder 10 of the pallet 23 located at the associated workpiece position 2.

Each receiving antenna possesses an optical status display 14 in the form of two LEDs 18, 19. The LED 18, for example, lights up green, and the LED 19, for example, red. Through determination of the switched-on state, optical display 14 provides the operator with an indication of the current status of the workpiece position 2. The optical display 14 in the form of the two LEDs 18, 19 as well as the receiving antenna 9 are appropriately designed as an enclosed unit and are arranged at, e.g. adhered to, a suitable location in the region of the associated workpiece position 2.

Figure 4:
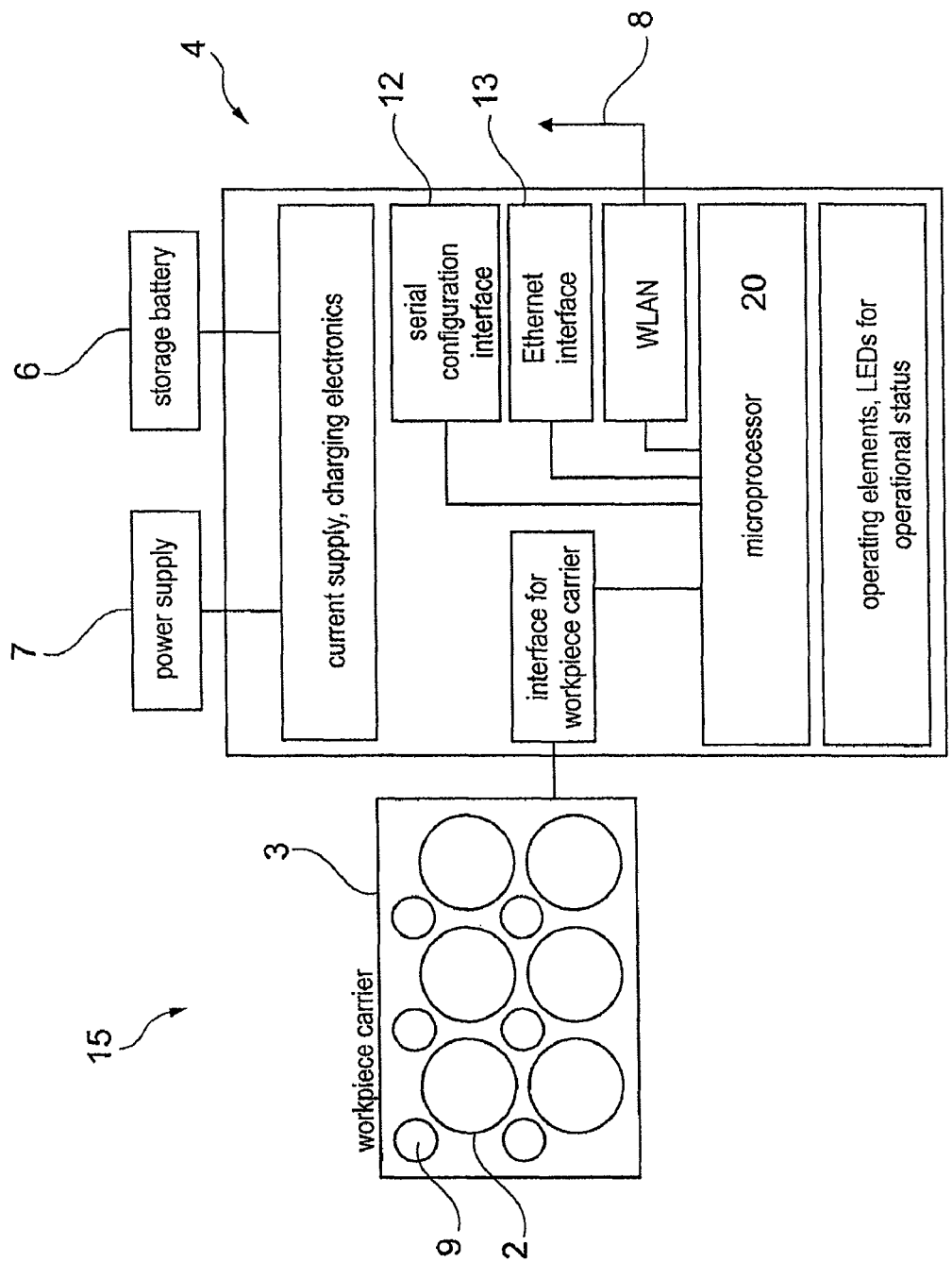
FIG. 4: shows a representation of a functional unit consisting of a magazine as well as a control unit.

FIG. 4 shows a detailed representation of the control unit 4 that controls the individual workpiece positions. The control unit 4 includes a microprocessor 20, which, for one thing, provides the querying of the individual receiving antennas 9 on the magazine 3, and for another thing processes the information queried from the magazine and transmits this information to the data-processing unit 5 (not represented in FIG. 5) via a data connection, which in the present case consists of a network 8, e.g. a WLAN. The supplying of current to the control unit 4 takes place via the power supply 7 or optionally, as already described, via the storage batter 6. The individual receiving antennas 9 are connected with the interface 11 to the control unit 4 via a stub line (not shown). The control unit 4, for one thing, controls the receiving antennas 9, and for another thing communicates with the data-processing unit 5, which works as a status-data generator and manager as well as a central control.

According to the invention, one or several magazines 3 can be connected to the microprocessor 20 of the control unit 4 via associated interfaces in each case. The individual receiving antennas are networked among themselves in the manner of a chain with preferably equal-length cable stretches and are connected to the interface 11 of the control unit 4.

The control unit 4 is contained in a suitable housing and is fixedly attached to the workpiece carrier 3 or additional magazines 3 (not shown).

The control unit 4 can include, for example, a number of interfaces, in particular at least five, wherein, per interface, a magazine 3 is connected to up to forty receiving antennas 9, i.e. workpiece positions 2. In the case of five communication interfaces, there results a total of 200 receiving antennas 9 that can be controlled by the control unit 4.

The serial interface 12 preferably serves the base configuration of the control unit as well as for diagnostic purposes in the system. With the use of WLAN, the communication interface operates according to 802.11b.

Further provided is an Ethernet interface 13, via which a data connection to a data-processing unit 5 is likewise possible.

Figure 5:
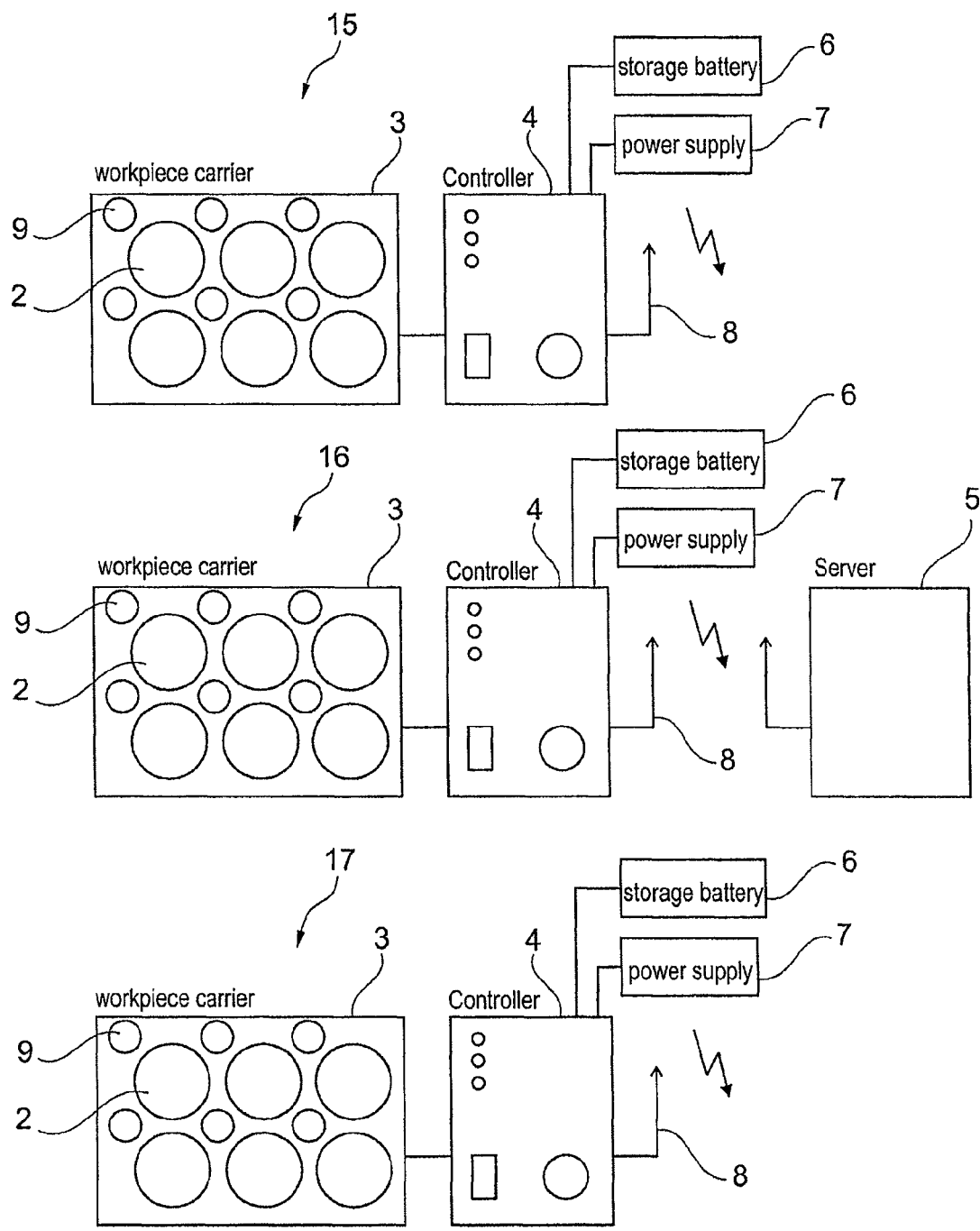
FIG. 5: shows a representation of multiple individual functional units that work together with the central data-processing unit.

According to FIG. 5, several functional units 15, 16, and 17 are provided, consisting in each case of one magazine 3 and one control unit 4 per functional unit, wherein the individual functional units 15, 16, and 17 communicate through their associated control unit 4 with the data-processing unit 5 via a network 8, e.g. WLAN. The individual functional units can, if need be, even be installed at different sites.

In addition, the above-described system includes an optical device (not shown in the drawings) for measuring the dimensions of the workpiece 1 and/or the positioning of the workpiece 1 in relation to the pallet 23. These data are likewise fed to the data-processing unit 5. With the aid of this information, it is possible to recognize whether or not a neighboring workpiece position 2 must be kept free, for example due to excessive dimensions of the workpiece 1 in question. Such optical measuring devices can be located at each workpiece position. Alternatively, a mobile device can also be provided, which can be associated with any workpiece position 2. Alternatively, it is also conceivable to proceed from central measuring unit that is detached from the workpiece position 2 or magazine 3.

Further, alternatively to the embodiments shown in the drawings, a single workpiece position or a group or several workpiece positions combined into a group can be designed so as to be locationally-mobile in relation to the magazine 3. For example, the workpiece position can be situated on a carriage or a slide, so that it can be moved from a particular location in a plant to another location, where the workpiece position is needed immediately, in a simple manner. The same applies to a group of several workpiece positions.

The functioning as well as the method in question are described in detail below. The control of all of the magazines 3 integrated into the network takes place by means of the data-processing unit 5. The network communication between the central data-processing unit 5 and the respective control unit 4 takes place discontinuously, for example every 15 seconds. The following controls take place by means of the control unit 4:

(a) Querying of which workpiece positions and/or pallets 23 are currently included or registered in the system. The pallets 23 are addressed via associated object references. Via the object reference, the ID of the pallet 23 in question can be queried constantly and without further network communication.

(b) Status querying of an individual workpiece position. This function makes it possible to verify that the workpiece position in question is "reachable", i.e. that a communication with the workpiece position is possible. In the case of successful communication the following information is transmitted:
the firmware version of the pallet/controller
an ID, by means of which the pallet can be identified
the number of workpiece positions
the state of the supply voltage (c) Querying of the workpieces currently included in a pallet. Per occupied position, the ID of the workpiece is read out either with the status of "released" or "locked", "supplied" or the status of "not present", in case no workpiece is placed into the position in question.

As far as the display is concerned, the following display states are appropriately provided:

| Red LED | Green LED | Meaning |
|---|---|---|
| Off | Off | No workpiece has been inserted. |
| Off | On | A workpiece has been inserted. This workpiece may be removed. |
| On | Off | A workpiece has been inserted. However, this workpiece may not be removed. It is locked. |
| On | On | The receiving antenna is currently active and is attempting to read the transponder of a workpiece. This process lasts approximately 100 milliseconds. |

In order to keep the amount of network communication as low as possible, it is further possible to set up a callback function that notifies the accessing application of changes in the workpiece occupation of the pallet or of the magazine. In addition, a switchover to a simulation mode can be made, in which mode physically present pallets can be completely done without.

The present invention makes it possible to guarantee a system for computer-assisted organization of workpieces to be processed in a production process in regard to, on the one hand, the speed of the processing course and, on the other hand, a high degree of production reliability. The invention thus represents a quite substantial contribution to the relevant field of technology.

| REFERENCE NUMERAL LIST | |
|---|---|
| 1 | workpiece |
| 2 | workpiece position |
| 3 | magazine |
| 4 | control unit |
| 5 | data-processing unit |
| 6 | storage battery |
| 7 | power supply |
| 8 | network |
| 9 | receiving antenna |
| 10 | transponder |
| 11 | interface |
| 12 | serial interface |
| 13 | Ethernet interface |
| 14 | optical display |
| 15 | functional unit |
| 16 | functional unit |
| 17 | functional unit |
| 18 | LED |
| 19 | LED |
| 20 | microprocessor |
| 21 | Ethernet interface |
| 22 | serial interface |
| 23 | pallet |

The invention claimed is:

1. System for computer-assisted organization of a workpiece to be subjected to a plurality of different processings, a plurality of the workpieces being located on at least one pallet, the system comprising:
a workpiece position assigned to each of the pallets, wherein a plurality of workpiece positions are combined in a magazine, each of the pallets being removable from the magazine;
means for determining status of the respective workpiece position,
a control unit for controlling the individual workpiece positions,
a data-processing unit in communication with the control unit, the data-processing unit processing information queried from the individual workpiece positions and generating status data;
an optical status display associated with each workpiece position displaying current status of the associated workpiece position.

2. System according to claim 1, wherein the status determination of the workpiece position comprises the determination of whether or not a workpiece is located in the workpiece position.

3. System according to claim 1, wherein the status determination of the workpiece position comprises the determination of whether or not the workpiece may be removed from the workpiece position.

4. System according to one of the claim 1, wherein the status determination of the workpiece position comprises the determination of whether or not a workpiece can be placed into the workpiece position.

5. System according to one of the claim 1, wherein the status determination of the workpiece position comprises the determination of the quality of the workpiece.

6. System according to one of the claim 1, wherein a receiving component is provided as the means for determining status.

7. System according to claim 6, wherein the receiving component comprises a receiving antenna for the identification of a transponder.

8. System according to claim 6, wherein the receiving component is positioned at the workpiece position.

9. System according to claim 8, wherein the transponder is attached to a workpiece carrier.

10. System according to claim 8, wherein for a plurality of workpiece positions a plurality of means for determining status are provided, wherein the means for status determination are read by the control unit via an interface.

11. System according to claim 8, wherein the means for determining status of the respective workpiece position is supplied with energy by the control unit.

12. System according to claim 11, wherein the characteristics of the status display are centrally determinable in the data-processing unit and are transmitted to the status display via the control unit.

13. System according to claim 1, wherein the overall production course is factored into the management of the status display in the data-processing unit.

14. System according to 1, wherein the status display includes a plurality of illumination devices of different types or different colors, and the determination of the information content takes place through determination of different combinations of states of the illumination devices.

15. System according to claim 1, wherein the system includes a plurality of individual functional units comprising a plurality of magazines and an associated control unit, wherein the functional units communicate with the data-processing unit.

16. System according to claim 15, wherein the communication of the functional units with the central data-processing unit takes place via a network connection, preferably via a WLAN.

17. System according to claim 1, wherein the characteristics of the status display cannot be influenced from the workpiece position.

18. System according to claim 1, wherein the workpiece position displays a holding or locking device for the workpiece, which device, depending on the determined status of the workpiece position, holds locked or locks the workpiece at the workpiece position.

19. System according to claim 1, wherein the workpiece position is locationally-movable relative to the magazine, either alone or as a group of several workpiece positions.

20. Method for computer-assisted organization of workpieces to be processed in a production process, wherein the workpieces are subjected to different processings, the method comprising:
  (a) locating a plurality of workpieces on at least one pallet, assigning individual workpiece positions to each pallet,
  (b) combining a plurality of workpiece positions in a magazine, wherein the pallets are removable from the magazine;
  (c) controlling the workpiece position in question by a control unit,
  (d) querying the workpiece position in question,
  (e) transmitting the queried data to a data-processing unit and, from this data, generating status data for the workpiece position in question is generated;
  (f) displaying the status of each workpiece position to an operator on an optical status display assigned to each workpiece position.

21. Method according to claim 20, wherein a query is made via the determination of the status data as to which workpiece positions are currently involved in the processing process.

22. Method according to claim 20, wherein the ID of the workpiece position in question is read out from the workpiece position and a data coupling of the ID of the workpiece position in question with the status data of the workpiece position in question takes place.

23. Method according to claim 20, wherein a releasing or locking function at the workpiece position can be determined and transmitted based on the data-processing unit.

24. Method according to claim 20, wherein the status of the individual workpiece positions is optically displayed at the workpiece position.

25. Method according to claim 20, wherein status changes of workpiece positions due to the processing course are automatically communicated to the data-processing unit.

* * * * *